United States Patent [19]

Smith

[11] Patent Number: 4,742,410
[45] Date of Patent: May 3, 1988

[54] DISK DRIVE SYSTEM WITH HEAD PROTECTION MECHANISM

[75] Inventor: Malcolm G. Smith, Grants Pass, Oreg.

[73] Assignee: Josephine County Technology, Inc., Grants Pass, Oreg.

[21] Appl. No.: 32,925

[22] Filed: Mar. 30, 1987

Related U.S. Application Data

[63] Continuation of Ser. No. 562,314, Dec. 16, 1983, abandoned.

[51] Int. Cl.⁴ .......................... G11B 5/54; G11B 21/22
[52] U.S. Cl. ......................................... 360/105; 360/97
[58] Field of Search .............................. 360/86, 97–99, 360/103–106, 137

[56] References Cited

U.S. PATENT DOCUMENTS

| | | | |
|---|---|---|---|
| 3,124,789 | 3/1964 | Wasylenko | 360/106 X |
| 3,646,536 | 2/1972 | Bleiman | 360/105 X |
| 3,984,873 | 10/1976 | Pejcha | 360/105 |
| 4,331,989 | 5/1982 | Viskochil | 360/97 |
| 4,371,903 | 2/1983 | Lewis | 360/105 X |
| 4,376,294 | 3/1983 | Meier et al. | 360/105 |
| 4,484,241 | 11/1984 | Brende et al. | 360/105 |
| 4,562,500 | 12/1985 | Bygdnes | 360/105 |

OTHER PUBLICATIONS

Hall et al., "Head Retraction Latch Mechanism," IBM Tech. Disc. Bull., vol. 20, No. 6, Nov. 1977.

Primary Examiner—Stuart N. Hecker
Assistant Examiner—Benjamin E. Urcia
Attorney, Agent, or Firm—Townsend and Townsend

[57] ABSTRACT

An improved magnetic disk drive system including a rotatable disk, a shiftable carriage having a pair of read-write heads mounted by resilient arms thereon for coupled relationship with the disk, and a stepper motor for advancing and retracting the carriage and thereby the heads with respect to the disk. A locking mechanism is shiftably carried by a fixed base forming a part of the system, the mechanism including a locking member moveable between the resilient arms, whereby the arms are spread apart and the heads are moved away from the disk to prevent contact of the heads with the adjacent surfaces of the disk. The movement of the blocking member is a function of the movement of the carriage into its fully retracted position. Moreover, the member effectively locks the carriage against movement when the carriage is in the fully retracted position thereof. By shifting the member in the opposite direction, the carriage can then be driven toward the disk and into an operative position by the stepper motor, and the system can then operate in the normal fashion. The spindle motor for rotating the disk serves as a generator for generating a voltage to drive the stepper motor when a power-off condition occurs.

3 Claims, 5 Drawing Sheets

DISK DRIVE SYSTEM WITH HEAD PROTECTION MECHANISM

This is a continuation of Ser. No. 562,314, filed Dec. 16, 1983, now abandoned.

BACKGROUND OF THE INVENTION

1. Field of the Invention

This invention relates to improvements in magnetic disk drives and, more particularly, to a disk drive having a means for protecting the heads against damage due to contact with an adjacent magnetic disk during periods of non-use or shipment.

2. Description of the Prior Art

A common problem associated with the use of magnetic disk drives of the Winchester type is damage due to the heads or disks of such a system due to shock to the system while power is off and the disk is not rotating. This problem commonly arises during manual handling of the drive system, or while the system is being shipped from one place to another. The problem is quite prevalent in the smaller, more portable drives, such as those using 5¼ inch disks.

Attempts have been made to eliminate this problem. For instance, one attempt has been to use shock mounts for the system so that less shock is transmitted to the vulnerable head/disk interface area. Other attempts include the placement of the heads over a non-recording zone on a disk so that data will not be lost if a head does contact the disk. This latter attempt appears to be a reasonable solution to the problem; however, it requires that some data storage area on a disk be surrendered to a "landing zone" for the head. In a worst case situation, both head and disk can be damaged notwithstanding the attempt to minimize or substantially eliminate damage.

In view of the foregoing problem, a need exists for improvements in means to protect the heads and disk of a magnetic disk drive system.

SUMMARY OF THE INVENTION

The present invention satisfies the aforesaid need by providing an improved magnetic disk drive system which has a locking mechanism for locking the heads at locations spaced from an adjacent disk. In this way, the heads are prevented from contacting the disk during a power-off condition so that the system can be shipped or otherwise handled without fear of damage to the heads or the disk. Thus, the improvement provided by the present invention extends the useful operating life of a magnetic disk drive system at minimum expense and with a minimum number of additional parts.

To this end, the improved magnetic disk drive system of the present invention includes a shiftable carriage having flexible arm means for mounting each head on the carriage. The carriage is shiftable relative to a base forming a part of the system so that each head can be moved into operative position adjacent to the surface of the disk itself. The carriage is shifted by a stepper motor which is also carried by the base and coupled in a conventional manner to the carriage.

A locking mechanism is provided for the system to shift the flexible arm means of the carriage away from the disk so that each head is moved into a position spaced a safe distance from the disk. This assures that the head will not contact the disk during manual handling or shipment of the system. In a preferred embodiment, the locking mechanism includes an elongated member pivotally mounted on the base and having a part which moves against the arm means as a function of the retraction of the carriage.

A further aspect of the invention is the provision of a spindle motor for the disk which serves as a generator during a power-off mode of the system. Thus, when power is removed from the system, the voltage generated by the spindle motor acting as a generator is used to power the stepper motor which retracts the carriage into a power-off or fully retracted position thereof. As it does so, the stepper motor actuates the locking mechanism, causing the locking action thereof to occur even though there is no power applied to the system itself. By subjecting the stepper motor to power thereafter, the locking mechanism is deactuated and the carriage causes each head to move back into a position ready for a read-write action with respect to the adjacent disk.

The primary object of the present invention is to provide an improved magnetic disk drive system which includes a locking mechanism for holding each magnetic read-write head of the system out of engagement with an adjacent magnetic disk so that there will be no damage to either the head or the disk during periods of non-use, such as when the system is moved from place to place or otherwise subjected to vibration and shock forces.

Another object of the present invention is to provide an improved magnetic disk drive system of the type described wherein the system includes an elongated member moveable into a position for shifting a head away from an adjacent disk when the carriage on which the head is mounted is moved to a power-off or fully retracted location to thereby eliminate any tendency for the head to contact the disk while the carriage has been retracted.

Still another object of the present invention is to provide a magnetic disk drive system of the type described wherein the elongated member is shifted into its locking position as a function of the retraction of the carriage with respect to the disk to thereby eliminate a power device for shifting the member to thereby assure that production costs remain at a minimum.

A further object of the present invention is to provide a magnetic disk drive system of the type described wherein the spindle drive motor for the disk of the system serves as a voltage generator immediately following a power-off condition of the system so that the voltage generated by the spindle drive motor can be used to power the stepper motor coupled with the carriage to retract the carriage and thereby automatically actuate the locking mechanism, all of which can be accomplished without the application of external power.

Other objects of this invention will become apparent as the following specification progresses, reference being had to the accompanying drawings for an illustration of the invention.

IN THE DRAWINGS

FIG. 6 is an elevational view looking into the direction of 6—6 of FIG. 5;

FIG. 7 is a side elevational view taken along lines 7—7 of FIG. 5; and

FIG. 8 is a bottom plan view of the disk drive system of FIG. 5.

DETAILED DESCRIPTION OF THE PREFERRED EMBODIMENT

Figure 1:
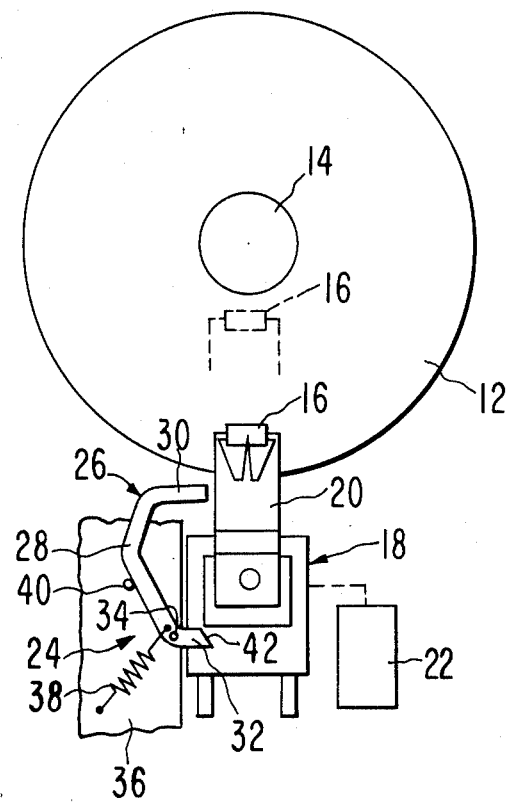
FIG. 1 is a schematic plan view of a magnetic disk drive system, showing a carriage for moving one or more magnetic read-write heads along a path adjacent to a magnetic disk and an elongated locking member for deflecting the heads away from the disk and locking the carriage against movement, the locking member being shown out of its locked position.

The present invention is directed to a magnetic disk drive system having one or more magnetic disks 12 mounted for rotation about a central axis 14 past one or more magnetic heads 16 coupled to a shiftable carriage 18 by a resilient arm 20 for each head, respectively. All of the foregoing elements are conventional in construction and, for purposes of illustration, a single disk 12 and a pair of magnetic read-write heads 16 are shown in FIGS. 1-4 to illustrate the teachings of the present invention.

Figure 3:
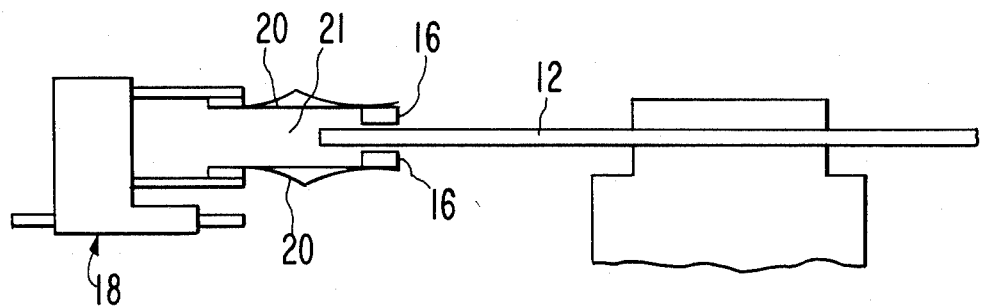
FIG. 3 is a schematic, side elevational view of the system of FIGS. 1 and 2, showing the operative positions of the heads on a disk with the locking member out of its locked position.

Heads 16 are coupled to the outer ends of respective, resilient arms 20 which, in turn, are spaced apart and are secured in cantilever fashion in any suitable manner to carriage 18. As the carriage moves toward and away from the disk central axis 14, the heads 16 are also carried over the adjacent surfaces of the disk. FIG. 1 shows two different operative positions of heads 16 with respect to the disk. FIG. 3 shows the gap 21 between arms 20.

Carriage 18 is selectively moved by a stepper motor 22 located adjacent to the carriage and coupled in any suitable manner to a support. The stepper motor incrementally advances or retracts the carriage with respect to disk 12 depending upon the polarity or other aspects of a signal directed by control structure (not shown) to the stepper motor. For instance, during a power-on condition, the heads are driven between the operative positions thereof shown in FIG. 1 by the operation of the stepper motor. Upon a power-off command, the carriage will typically be stepped so that the heads will be moved to fully retracted positions shown in FIG. 2, such positions being adjacent to the outer periphery of the disk rather than in overlying relationship thereto.

Figure 2:
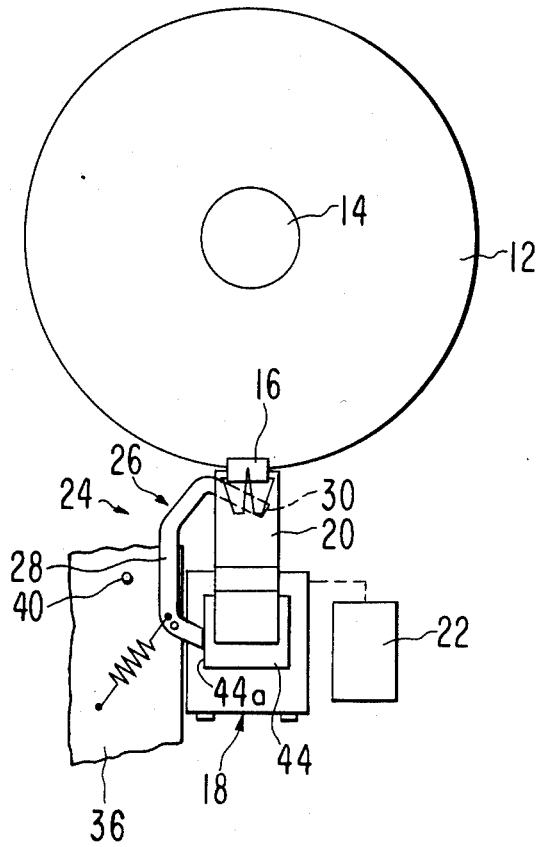
FIG. 2 is a view similar to FIG. 1, but showing the locking member in its locked position.

System 10 further includes a locking means 24 for locking the heads in positions spaced outwardly from the disk when the heads are in their fully retracted positions (FIG. 2). Thus, the heads will be fully protected against shock and vibration damage during handling, such as shipping of the system from place to place. Locking means 24 also operates to lock carriage 18 in a power-off location (when the heads are in their fully retracted positions) to protect the carriage handling or shipping. Furthermore, locking means 24 operates to reduce the cantilever lengths of arms 20 to prevent excursion of the heads into contact with the disk.

Locking means 24 includes an elongated locking member 26 having a first, main segment 28 and a pair of laterally extending end segments 30 and 32. Member 26 is pivoted by a pin 34 to a base 36 forming a part of the fixed housing of system 10. Carriage 18 moves relative to base 36. A spring 38 coupled to segment 28 and to base 36 biases member 26 against a fixed stop 40 on base 36. When the segment 28 is against stop 40, segment 30 is spaced outwardly from arms 20 and gap 21 (FIG. 3).

End segment 32 is provided with an inclined end face 42 which is in the path of travel of a part 44 of carriage 18. Thus, when the carriage is moved from its outermost operative position shown in FIG. 1 to its power-off condition shown in FIG. 2 by the stepper motor, part 44 engages face 42 and causes member 26 to pivot from a retracted position shown in FIG. 1 to a locking position shown in FIG. 2. During this time, face 42 engages a side face 44a of part 44. Moreover, face 42 frictionally engages side 44a, thereby substantially locking carriage 18 in a fixed position with respect to base 36 and disk 12.

Figure 4:
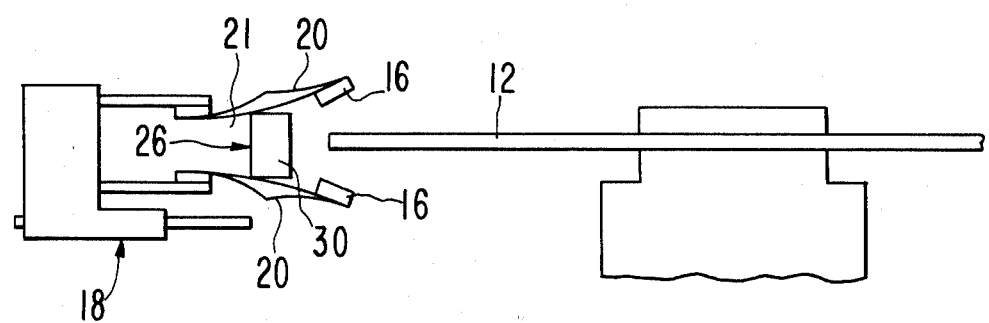
FIG. 4 is a view similar to FIG. 3, but showing the locking member in its locked position.

When member 26 is in the position shown in FIG. 2, segment 30 is in gap 21 as shown in FIG. 4. While in the gap, end segment 30 causes arms 20 to be spread apart to the shift heads 16 a safe distance away from disk 12. Also, the end segment 30 engages arms 20 at locations intermediate the ends of the arms so that the effective cantilever lengths of the arm are shortened to thereby inhibit the possible engagement of the heads with the disk. This further enhances the protection available by virtue of the locking action of member 26.

The carriage 18 will also be locked in place by the detent torque of stepper motor 22. Thus, the carriage is effectively locked in place by the dual action of the stepper motor and the frictional engagement of end segment 32 with part 44.

Figure 5:
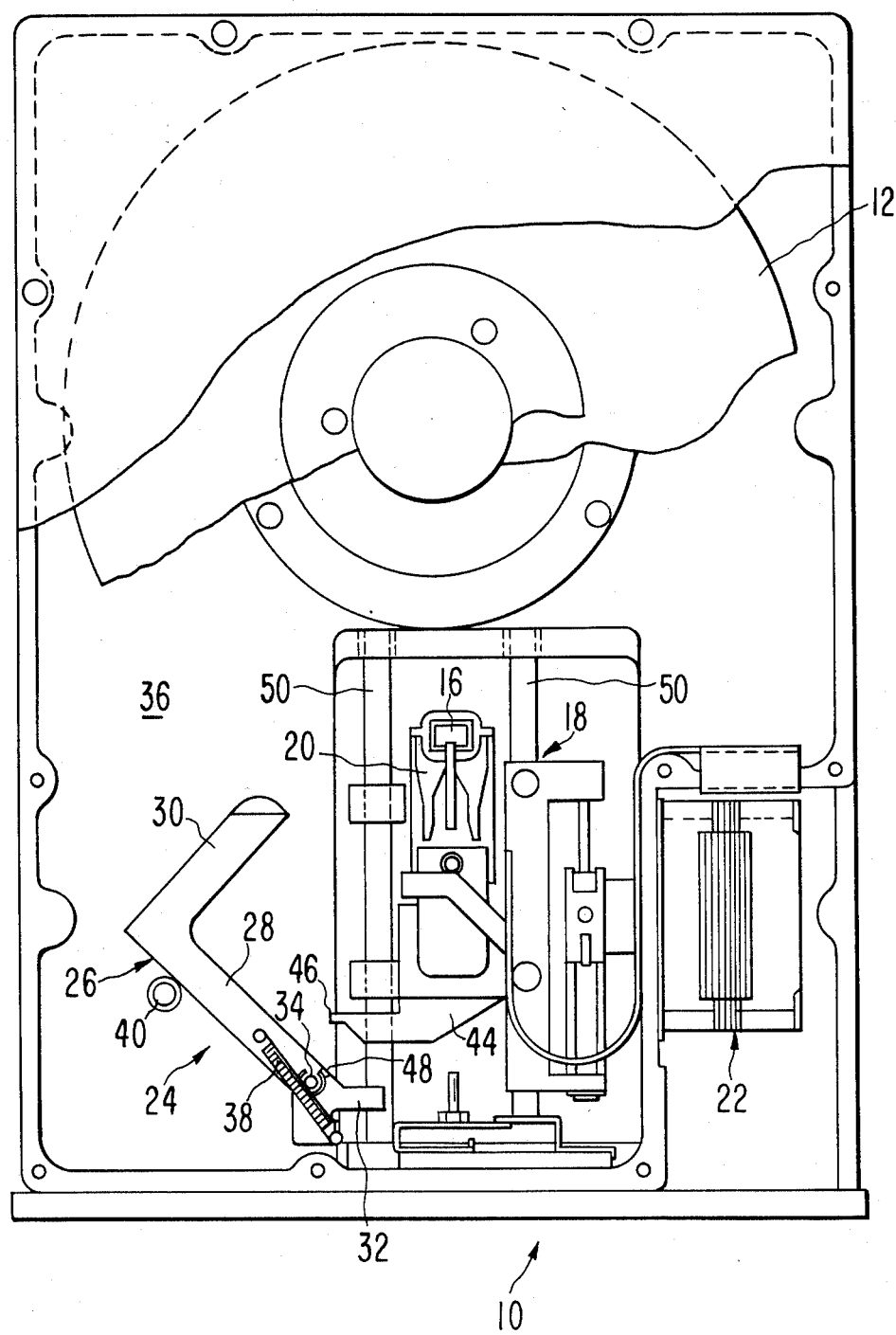
FIG. 5 is a top plan view of an actual implementation of the system, parts being broken away and showing the locking member out of its locked position.

FIGS. 5-8 show an actual implementation of system 10 in which disk 12 is mounted for rotation within a housing having base 36 as a main part. The housing has an opening 36a (FIG. 8) in base 36 for mounting carriage 18 shown in detail in FIG. 5, heads 16 being secured to respective arms 20 and the carriage being moveable along a pair of parallel rails 50 relative to base 36. Member 26 is shown in FIG. 5 as being pivoted by pin 34 on base 36 and biased by spring 38 against stop 40.

For purposes of illustration, end segment 32 is adapted to be engaged by part 44, and part 44 has a lateral projection 46 receivable within a notch 48 in the side of member 26. Thus, as carriage 18 is retracted into its power-off position, projection 46 enters notch 48 about the same time that part 44 is engaging end segment 32. As part 44 continues to move into its power-off position, member 26 is rotated about pin 34 in a clockwise sense and projection 46 enters notch 48. When the end segment 30 passes between arms 20 carrying heads 18, projection 46 will fully be received within notch 48, thereby locking the carriage against movement relative to base 36 while at the same time heads 16 will be spread apart and be safely spaced from the adjacent surfaces of disk 12.

System 10 also provides circuitry for causing the operation of stepper motor 22 when power is removed from system 10. When this power off condition occurs, the D.C. spindle motor 54 (FIG. 7) for rotating disk 12 is switched by the circuitry from a motor configuration to a generator configuration. The voltage generated by the rotating shaft of the spindle motor is used to power the stepper motor and move carriage 18 into its power-off or fully retracted position shown in FIG. 2. Thus, the carriage is never stopped at an operative position with the heads adjacent to the disk surfaces. This feature assures that the locking mechanism will automatically be operated even though power has been removed from the system. A secondary, very desirable effect is that, by using the energy stored in the rotating mass of the spindle motor, dynamic braking is applied to the spindle motor drive shaft itself.

I claim:

1. A magnetic disk drive system comprising:
 a support;
 a magnetic disk mounted on the support for rotation with respect thereof;
 a carriage shiftably mounted on the support for movement toward and away from the disk between an operative position and a retracted position;
 a magnetic read-write head;
 a resilient arm coupling the head to the carriage for movement therewith, whereby the head can be moved into and out of an operative location adjacent to the surface of the disk as the carriage moves between its operative position and a retracted position;
 a stepper motor coupled to the carriage for moving the same relative to the support; and
 an elongated member pivotally mounted on the support and having means permitting the member to move into engagement with the arm to cause the arm to flex and to move the head away from the disk in response to the movement of the carriage into its retracted position, and for subsequently holding the head in spaced relationship to the disk after the carriage has reached its retracted position, said member having means for releasably locking the carriage in its retracted position, said locking means including an end segment having an end face for frictionally engaging an adjacent surface of the carriage when the latter is in said retracted position.

2. A system as set forth in claim 1, wherein said face is angled relative to the directions of movement of the carriage and is in the path of travel of the carriage when the carriage is in its operative position.

3. A magnetic disk drive system comprising:
 a support;
 a magnetic disk mounted on the support for rotation with respect thereof;
 a carriage shiftably mounted on the support for movement toward and away from the disk between an operative position and a retracted position;
 a magnetic read-write head;
 a resilient arm coupling the head to the carriage for movement therewith whereby the head can be moved into and out of an operative location adjacent to the surface of the disk as the carriage moves between its operative position and a retracted position;
 a stepper motor coupled to the carriage for moving the same relative to the support; and
 an elongated member pivotally mounted on the support and having means permitting the member to move into engagement with the arm to cause the arm to flex in a direction to move the head away from the disk in response to the movement of the carriage into its retracted position and for holding the head in spaced relationship to the disk as the carriage moves into its retracted position, the member having a notch, and said carriage having a projection receivable in the notch as the carriage moves toward its retracted position, the projection and the portion of the member having said notch defining a locking means for releasably locking the carriage in its retractive position.

* * * * *